(12) United States Patent
Krueger

(10) Patent No.: US 7,182,917 B2
(45) Date of Patent: Feb. 27, 2007

(54) STEAM-REFORMING CATALYTIC STRUCTURE AND PURE HYDROGEN GENERATOR COMPRISING THE SAME AND METHOD OF OPERATION OF SAME

(75) Inventor: Charles W. Krueger, Cambridge, MA (US)

(73) Assignee: Hy9 Corporation, Woburn, MA (US)

( * ) Notice: Subject to any disclaimer, the term of this patent is extended or adjusted under 35 U.S.C. 154(b) by 256 days.

(21) Appl. No.: 10/393,772

(22) Filed: Mar. 12, 2003

(65) Prior Publication Data

US 2003/0172589 A1 Sep. 18, 2003

Related U.S. Application Data

(60) Provisional application No. 60/363,672, filed on Mar. 12, 2002.

(51) Int. Cl.
*B01D 63/00* (2006.01)
*B01J 12/00* (2006.01)

(52) U.S. Cl. ............... 422/129; 422/187; 422/211; 422/222; 96/4

(58) Field of Classification Search .......... 96/4; 422/129, 187, 211, 222
See application file for complete search history.

(56) References Cited

U.S. PATENT DOCUMENTS

| 6,033,634 | A  | * | 3/2000  | Koga ..................... 422/198 |
| 6,171,574 | B1 | * | 1/2001  | Juda et al. ............... 423/648.1 |
| 6,214,757 | B1 | * | 4/2001  | Schwartz et al. ............ 502/4 |
| 6,231,831 | B1 | * | 5/2001  | Autenrieth et al. ....... 423/648.1 |
| 6,338,833 | B1 | * | 1/2002  | Aasberg-Petersen ........ 423/652 |
| 6,923,944 | B2 | * | 8/2005  | Buxbaum ................ 422/211 |
| 2002/0141919 | A1 | * | 10/2002 | Alvin ..................... 422/211 |
| 2005/0191221 | A1 | * | 9/2005  | Etemad et al. ............ 422/211 |

* cited by examiner

*Primary Examiner*—Timothy C. Vanoy
(74) *Attorney, Agent, or Firm*—Rines and Rines

(57) ABSTRACT

A reactor/purifier for generating pure hydrogen in a stack or array of pairs of alternatingly connected high and low pressure reactor chambers wherein a gas-porous turbulence-promoting screen structure washcoated with a steam-reforming catalyst is sandwiched between a planar hydrogen-selective palladium alloy membrane and a planar gas-impermeable heat-conducting metal plate within the high pressure reactor chamber of each high pressure reactor chamber; and wherein the catalyst-coated structure in each high pressure chamber is reacted with steam and hydrocarbon fuel, such as methane or syn/gas, and/or carbon monoxide at an appropriately controlled temperature of between about 200° C. to 650° C. to produce hydrogen and carbon oxides within an isothermal temperature range in each high pressure reactor chamber, while simultaneously permeating pure hydrogen therefrom through the membrane into the corresponding connected low pressure reactor chamber.

14 Claims, 1 Drawing Sheet

Exploded View of Stack

Figure 1: Exploded View of Stack
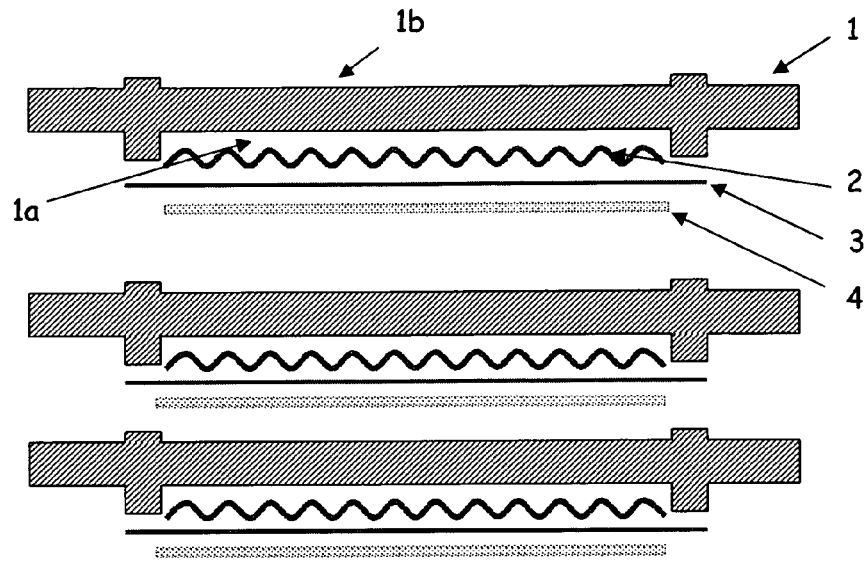
Figure 1A: Assembled Stack
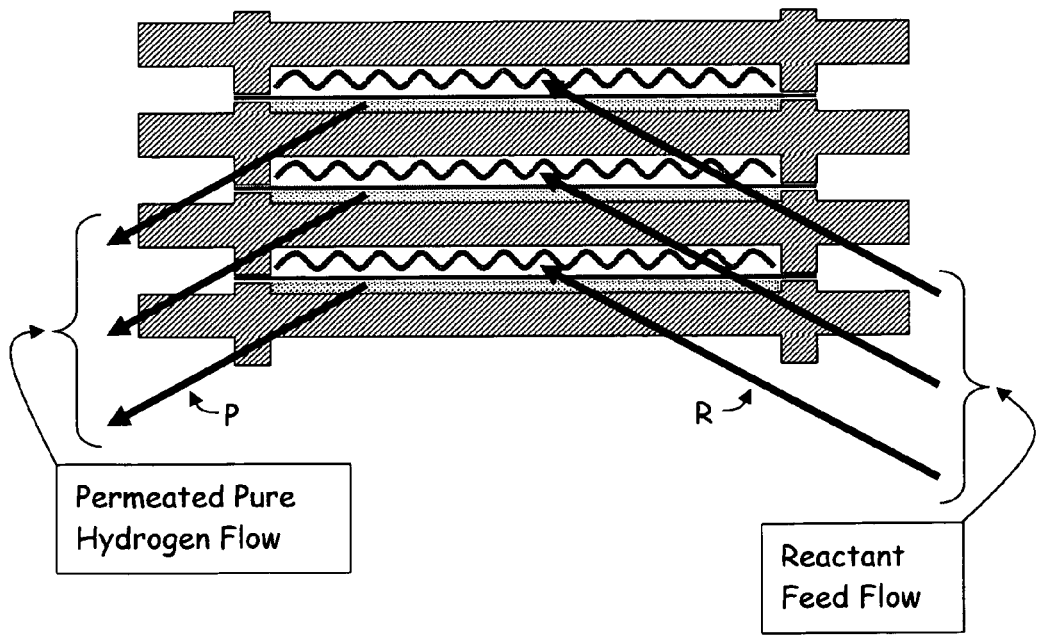

STEAM-REFORMING CATALYTIC STRUCTURE AND PURE HYDROGEN GENERATOR COMPRISING THE SAME AND METHOD OF OPERATION OF SAME

Priority is claimed based upon provisional application 60/363,672 filed Mar. 12, 2002.

FIELD OF THE INVENTION

The present invention relates broadly to steam-reforming catalytic structures and hydrogen generation, being more particularly concerned with novel unitary catalytic structures and methods for generating hydrogen by reacting steam with a gaseous or gasified fossil hydrocarbon fuel and the like at a moderately elevated temperature, and still more particularly with palladium-bearing membrane pure hydrogen generators comprising the same.

BACKGROUND OF THE INVENTION

As explained in provisional patent application 60/363,672, filed Mar. 12, 2002, and on the basis and priority of which this application is filed, the prior art is replete with descriptions of catalysts for producing hydrogen by the reaction of steam (herein "steam reforming"), at moderately elevated temperatures, with gaseous or gasified fossil fuels including natural gas, propane, methanol, carbon monoxide (e.g. made by partial oxidation of coal) and mixtures comprising carbon monoxide and hydrogen (herein "syn-gas") and derivatives thereof including methanol and ethanol and the like. Further, generating pure hydrogen therefrom, while it is so produced, by permeation through a hydrogen-selective palladium bearing membrane is well known in the art, as reviewed for example, in U.S. Pat. No. 6,171,574 B1 (2001) of common assignee, incorporated herein by reference.

Cost-effective production of hydrogen from fossil fuels is becoming increasingly important in the environmentally acceptable generation of electricity by means of the emerging fuel cell systems; and more particularly, low-cost pure, i.e. carbon oxides-free, hydrogen is needed for use in the preferred PEM fuel cells.

Traditional catalytic structures are particulates, such as ceramic pellets. More recently, costly ceramic catalytic monoliths have been introduced in the automotive catalytic reactors where their low pressure drop (compared to pellet beds) has been a "must". Low pressure drop catalytic metallic monoliths and foams are known as well. These structures are bulky and are thus unsuitable for incorporation into compact catalytic reactors, as is advantageous for incorporating into the above referred to pure hydrogen membrane generators.

The general idealized overall steam reforming reactions are:

$$C_xH_{2y}+xH_2O=xCO+(x+y)H_2 \quad (1)$$

For hydrocarbon fuels: the

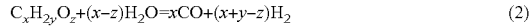

$$C_xH_{2y}O_z+(x-z)H_2O=xCO+(x+y-z)H_2 \quad (2)$$

For oxygen containing fuels such as alcohols and for gasified fuels and in general

$$CO+H_2O=CO_2+H_2, \quad (3)$$

which is commonly referred to as the water-gas shift (herein "WGS") reaction.

This shift reaction (3) typically occurs simultaneously with either reaction (1) or (2) above, but is traditionally completed in a secondary steam reformer reactor at a lower temperature than the primary reactor. This is due to reactions 1 and 2 being endothermic, where reactant conversion is favored at high temperatures, while reaction 3 is exothermic with reactant conversion being favored at low temperatures. In the case of "gasification" processes, high temperature partial oxidation of the carbon bearing fuel results in a gas mixture which is predominantly CO and $H_2$. This mixture can then be further reacted with steam to maximize hydrogen production according to reaction (3), again, typically in a second, low temperature reactor.

Although reactions (1)–(3) above are traditionally carried out in packed bed catalytic reactors, recent art has demonstrated the benefits of conducting these reactions in hydrogen permeable membrane reactors where the hydrogen is removed in situ. It is to be appreciated that the removal of product hydrogen similarly serves to favor reactant conversions in all 3 cases allowing increased flexibility in choosing operating temperatures. Specifically, in a hydrogen permeating membrane reactor, reactions (1) and (2) can be conducted efficiently at lower temperatures while reaction (3) can be conducted at higher temperatures. Specific reference is made to U.S. Pat. No. 6,180,081 B1, before-mentioned U.S. Pat. No. 6,171,574 of common assignee, U.S. Pat. Nos. 5,326,550, 5,639,431, 6,033,634 all incorporated herein by reference each describing various embodiments of membrane steam reforming reactors.

Most of the above art on membrane reactors relies on the traditional particulate catalytic structures such as spheres or pellets, before-mentioned. In contrast, the present invention seeks to incorporate non-particulate, unitary washcoated catalytic structures such as metal screens as will be described in more detail below. Washcoating of catalysts onto unitary structures is known in the art, catalytically washcoated ceramic monoliths are commercially offered in automotive exhaust "catalytic converters". Also, washcoating of metallic structures such as wires, screens or metal monoliths is also known in the art. Of particular relevance to the present invention are U.S. Pat. Nos. 4,464,482 and 4,456,702 each disclosing metallic screen or wire structure with a catalyst washcoat applied thereto also incorporated herein by reference.

The configurations in U.S. Pat. No. 6,033,634 (2000) entitled "Plate Type Shift Reformer and Shift Converter with Hydrogen Permeate Chamber", (Inventor M. Koga) show palladium-bearing membrane reactors with in situ heat transfer chambers for the endothermic steam-reforming of natural gas (see. Col. 3, lines 13–14) and/or the exothermic water-gas shift reaction (Col.3, lines 23–24), using conventional particulate reforming and shift catalysts. In this invention, two gas streams (one the heat transfer gas and the other a reacting gas) are contacted by an alternating interconnected array of gas passages. The heat transfer gas chambers are "filled with alumina balls . . . for promoting heat transfer"), whereas the reaction gas chambers are filled with the particulate catalyst materials. To the contrary, the present invention uses a flat unitary turbulence promoting structure washcoated with catalyst which is sandwiched between the Pd-bearing membrane and a heat conducting metal plate of controlled thickness. This metallic sandwich eliminates Koga's heating chambers and simplifies heating or cooling, as the case may be, of the hydrogen generating reactions thereon within an appropriate isothermal temperature range. The design of the present invention is also easier to manufacture, requiring fewer specialized machining operations.

As before stated, cost-effective on site hydrogen production from fossil fuels is becoming increasingly important not only replacing expensive and hazardous shipments of liquid or compressed hydrogen, but especially enabling the environmentally acceptable generation of electricity by fuel cells, and, in particular, low-cost pure (i.e. carbon oxides-free) hydrogen for the before-mentioned preferred PEM fuel cell systems. Membrane reactors have promise to meet these growing demands for distributed hydrogen generation but have been historically limited due to the high palladium content in the membranes. In accordance with U.S. Pat. No. 6,103,028 of common assignee, also incorporated herein by reference, substantial palladium cost reduction has been achieved by the use of supported thinned planar palladium alloys, such as, especially, palladium copper alloy foils, in lieu of the inherently much thicker tubular palladium-silver membranes of the prior art.

In contrast to the prior art, the present invention is directed to membrane reactors comprising flat unitary catalytic structures which allow heating (without internal air oxidation) or cooling of the reaction zone, as the case may be, primarily by conduction, to keep hydrogen generation and purification going within an acceptable temperature range (herein called the "isothermal range") at enhanced yields of hydrogen permeates.

The term "unitary catalytic structure", as used herein, means a substantially flat but open catalyst holder washcoated with an adhering steam-reforming catalyst, and the term "dimensionally-controlled", as used herein refers to selecting the structure dimensions including thickness and open area to provide convective gas flow for enhanced heat and mass transfer within the isothermal range to and/or from the catalyst, while insuring substantially unimpeded access of the hydrogen generated thereon to the selective membrane.

OBJECTS OF THE INVENTION

It is a specific object of this invention to provide a novel thin unitary catalytic structure utilizing, in lieu of a pellet or a monolith or the like, an inexpensive catalyzed holder including a metallic screen, a woven glass cloth and a preferably non-flattened expanded metal, and adhere thereon a catalytic composition comprising an oxide support and an appropriate steam reforming catalyst.

It is a further object of this invention to incorporate such unitary catalytic structures in the high pressure chamber(s) of a pure hydrogen generating membrane reactor, wherein they function, additionally, as turbulence promoters, as explained in the above referred to "574 B1" patent.

More broadly, the principal object of the invention, is to provide a new and improved steam-reforming catalyst structure and hydrogen generator comprising the same and an improved method of such generation that shall not be subject to the above-described and other limitations and disadvantages of the prior, but, to the contrary, provide less expensive structures and improved hydrogen generation.

A further object is to provide a novel catalytic structure utilizing, in lieu of a pellet or a monolith or the like, an inexpensive catalyzed gas porous structure including a metallic screen or a preferably non-flattened expanded metal washcoated with an appropriate oxide and a steam-reforming catalyst.

Another object of the invention is to provide a novel sandwich of a gas-porous metallic structure washcoated with a steam-reforming catalyst between one planar hydrogen-selective palladium alloy membrane and one planar heat-conducting metal plate in each high pressure chamber of alternating low and high pressure chambers to produce in the latter hydrogen and carbon oxides and simultaneously permeating therefrom pure hydrogen into each connected low pressure chamber, while providing the required heat transfer in situ predominantly by conduction through said plate.

For further enhanced heat conduction, it is also an object of this invention to provide each low-pressure chamber with a metallic gas-porous membrane support sandwiched between one membrane and one plate.

An additional object for cases where heating or cooling requirements are modest, as is the case for methanol steam-reforming and for the shift reaction in reactors of moderate capacity, is to provide novel non-metallic structures, such as a woven glass cloth, fabrics and the like with suitable catalyst and/or membrane supports.

Other and further objects will be pointed out hereinafter and in connection with the detailed description of the invention and in the appended claims

SUMMARY OF THE INVENTION

In summary, from one of its viewpoints, the invention embraces a membrane reactor/purifier for producing mixtures comprising hydrogen and carbon oxides by steam-reforming a gaseous or externally gasified fossil fuel or a derivative thereof and generating pure hydrogen therefrom by permeating through a planar hydrogen selective palladium alloy membrane at a controlled, moderately elevated isothermal temperature range, said reactor/purifier comprising a stack containing an array of pairs of high pressure and lower pressure chambers connected to each other by one said membrane, said pairs being interconnected by metallic heat conducting plates impervious to all gases including hydrogen, and each high pressure chamber being provided with a dimensionally controlled unitary structure washcoated with a steam-reforming catalyst.

Broadly the invention describes a steam-reforming catalyst washcoated on a gas-porous preferably metallic structure sandwiched between one planar hydrogen-selective palladium alloy membrane and one planar gas (including hydrogen)-impermeable heat-conducting metal plate in each high pressure chamber of a stack array of pairs of alternating low and high pressure chambers to produce in the latter hydrogen and carbon oxides within an isothermal temperature range and simultaneously permeating therefrom pure hydrogen into each of connected low pressure product chamber connected thereto, while providing the required heat transfer to or from said catalyst in situ predominantly by conduction through said plate.

A unitary catalytic structure of the invention combines a thin catalyst holder with a catalytic composition adhered thereon. The holder is a metallic screen, a woven glass cloth or a preferably non-flattened expanded metal and the composition comprises an oxide, including ceria, supporting a copper, iron and/or nickel catalyst. A steam-methanol mixture consisting predominantly of hydrogen and carbon oxides at the unexpectedly high catalytic efficiency of about 300,000 cc of methanol feed per hour per gram of copper catalyst.

Broadly, compared with reactors described in the above-referred to "574 B1" patent, pure hydrogen has now been generated in a compacted reactor of enhanced utility, by reacting steam, within a controlled wide temperature range between about 200° C. and 650° C., with a gaseous or gasified fossil fuel on a thin turbulence-promoting unitary structure in the high pressure chamber(s) of the reactor.

Specifically, a palladium alloy bearing-membrane reactor generating pure hydrogen has (1) its high pressure chamber(s) provided with the turbulence-promoting unitary structure of a stainless steel screen holder with its adhered ceria-containing oxide composition supporting an iron or copper catalyst, and (2) means of reacting thereon steam with methanol, syn-gas and/or carbon monoxide at a controlled temperature between about 200° C. and 550° C.

Yet another such palladium bearing-membrane pure hydrogen generating reactor, in which the turbulence promoting unitary assembly bears a nickel catalyst (in lieu of an iron or copper catalyst), has means of steam-reforming thereon gaseous hydrocarbons at a controlled temperature between about 450° C. and 650° C.

Preferred and best mode designs and embodiments are hereinafter presented in detail.

BRIEF DESCRIPTION OF THE DRAWINGS

The invention will now be described in connection with the accompanying drawing, FIG. 1 of which shows an exploded cross-sectional view of three identical stack components, and FIG. 1A, a similar view of an assembled stack as constructed according to the present invention.

DETAILED DESCRIPTION OF THE INVENTION

In the prior art case of U.S. Pat. No. 4,464,482 referenced above, it is disclosed that, for example, catalyzed screen structures provide superior catalyst utilization and are less prone to plugging and excessive pressure drops due to fine particles produced due to catalyst attrition or particulates already present in the reactant feed. It should be noted that the object of the 482 patent is to perform three phase reactions (gas, liquid, solid), where the liquid component can create considerable resistance to flow in a reactor and where the screen structure " . . . imparts disturbance to the flowing fluids". For the present invention, metallic screens are typically selected from ordinary metal "woven wire cloth" which is commercially available at low cost. The structure of the cloth is appreciated to provide excellent flow mixing when the flow is directed along the length of the cloth as the vast majority of the gas flow space is tortuous. Of course, other structures can provide similar tortuous flow paths. A standard woven wire cloth, when laid flat, has a height which is approximately twice the diameter of the wire used to form the cloth. In this invention, the general gas flow path is in a direction perpendicular to this height, i.e. the gas is flowed along the length of the screen.

In FIG. 1, an exploded view cross section of a preferred form of the present invention is shown, and in FIG. 1A, the stack is shown assembled. A heat conducting plate 1 defines two chambers; a high-pressure reaction chamber 1$a$ and a low pressure permeate chamber 1$b$. The high-pressure chamber is filled with the unitary catalyst structure 2. The high and low pressure chambers are separated by a membrane 3 supported by a membrane support 4 which, if metallic, may need to be provided with means of preventing intermetallic diffusion between the support 4 and the membrane 3 as is known in the art. The heat conducting plate 1 is shown with heat transfer fins extending out to the two sides and the high pressure reactant flow path is directed into the page (or alternatively out of the page)—schematically shown by arrows R in FIG. 1A. A plurality of these elements is assembled to form a stack as shown in FIG. 1A by repeating such chamber pairs. The flow of reactants in parallel to the stack can be accomplished by appropriate flow distribution means, i.e. a header or manifold arrangement. Other flow arrangements are also possible, i.e. series or series/parallel.

The high-pressure cavity 1$a$ wherein the catalyzed wire cloth 2 is housed should be of a height dimension equal to or preferably slightly higher than the height of the catalyzed screen in order to prevent rupturing of the membrane during assembly operations. It has been found that a cavity dimension about 5–10% higher than the height of the screen can be used while still obtaining the benefits of the tortuous flow path on gas mixing.

The catalyzed screen 2 is fabricated in such a way as to allow adequate communication between the three surfaces of interest. It is an object of this invention to provide a combined catalyst structure and channel geometry such that a gas stream when passing along the channel "simultaneously" contacts all three surfaces 1, 2 and 3 providing efficiency in mass transfer to the catalyst surface 2 and the hydrogen membrane surface 3, and in heat transfer with the heat conducting surface 1 and the catalyst surface 2. It is therefore critical that the flow velocity be sufficient to achieve this mixing given the other dimensions of the device. Thus, in the combination of low flow rates with large height, open cavities must be avoided because it is the mixing of the gas that serves to achieve the objects of this invention. A typical reaction channel in this invention will therefore have length in the direction of the flow equal to or greater than its width perpendicular to the flow path, which is at least in the range from 10–100 times the height of the channel, and hence screen. It has been determined that good reactor performance is achievable if the Reynolds number, herein defined according to the inlet gas properties at the reactor temperature and using the standard definition of an equivalent pipe diameter for the rectangular cross section channel (here 4 times the rectangular cross sectional area divided by its perimeter), is greater than about 1.0 and less than about 1000 and preferably in the range from about 10 to about 100.

In accord with the mixing effect described above, the catalyst washcoat must be provided in such a fashion as to prevent undesirable "blocking" of the spaces between the wires. It is therefore desirable to provide washcoats which block less than 50%, and preferably less than 25% and more preferably less than 5% of the screen openings. It is appreciated that in the extreme case of full blockage, the screen is thus transformed into a catalyst "slab" which effectively blocks gas phase communication between the heat transfer surface and the hydrogen membrane surface. In this instance, although contact with the catalyst 2 may still be substantial overall, a substantial portion of the gas phase will infrequently contact the hydrogen membrane 3 whereas the other substantial portion will infrequently contact the heat transfer surface 1. These instances of "channeling" are partially representative of what this invention seeks to overcome in a practical fashion. It is further appreciated that this reactor device according to this invention should efficiently utilize each of it's elements, these being the heat transfer wall, the catalyst structure, and the hydrogen permeable membrane. Thus, for example, the hydrogen membrane 3 must be provided with sufficient hydrogen to achieve optimal performance. As the hydrogen is produced by the catalytic reaction, it is therefore necessary that the amount of active catalyst surface in proportion to the membrane surface be sufficient. High activity catalysts are naturally preferred. However, it is also desired to not use more catalyst than necessary, as this catalyst will not itself be utilized efficiently, adding unnecessary cost to the device. Also, overloading the catalyst can lead to high reaction at the inlet, which, in the case of exothermic reactions, can lead to localized overheating and possible damage. Furthermore, larger catalyst volume requirements per unit surface of the membrane will require a larger average distance between the heat conducting plate and the catalyst, further increasing inefficiency. Thinner hydrogen membranes, which can permeate more hydrogen per unit area such as discussed above, therefore increase the demands on the catalyst activity.

In the case of an endothermic reaction, sufficient heat energy must be provided to the reacting gas stream by the heat conduction plate while maintaining an "isothermal" condition within the reactor. The term "isothermal", as sometimes used herein, defines a temperature range within about plus or minus 30° C. of the isothermal temperature. For the exothermic reaction, sufficient heat energy must be removed from the reaction zone to maintain the isothermal condition. Because the heat is primarily delivered to or removed from the reaction zone by conduction along the heat conducting plate, it is necessary that the plate thickness be sufficient to conduct the necessary amount of heat along its length. Again, as it is desired to achieve an optimal design, the plate thickness should not be overly large as this would add unnecessary weight and thermal mass to the device as well as additional cost (of material). It is further appreciated that the plate itself should have a high thermal conductivity. The plate is also required to provide structural rigidity surface on the edge and is therefore must maintain it's rigidity at temperature. In some instances, it may be desirable to utilize a composite heat conducting plate, such as a clad structure. Copper/steel or copper/stainless steel clad structures are suitable for such applications combining the high conductivity of the copper with the strength of the steel.

Especially for highly endothermic steam reforming reactions, such as steam reforming of natural gas, the overall module design will often be elongated in the direction of the reactant flow. The flow will be directed along the long axis and the heat transfer will primarily be directed from the sides, in the direction perpendicular to the main flow direction. In these instances, to achieve high heat transfer rates into the design it is desirable that the heat transfer plates extend outwards from the stack into the heat source zone so as to enhance convective heat transfer to the stack by the use of so-called heat transfer enhancing fins.

In general, external heat sources may provide heat by conduction, convection, radiation, or combinations of these. However, because it is desirable to achieve an isothermal condition within the reactor, convection of heat from a second, externally generated gas stream is the preferred means of providing heat to the endothermic reactor. In this way, the temperature of the externally generated hot gas stream can be controlled to a pre-specified value prior to contacting the membrane reactor. This overcomes several potential difficulties in radiative heat transfer, which often involve direct exposure of the outer reactor surface to a hot flame or other hot element, leading to localized high temperatures on the reactor exterior, potentially accelerating corrosion of the reactor shell or damaging the membrane and/or catalyst near the reactor outer boundary.

The said externally generated high temperature gas stream may be achieved by combustion of a fuel with air, or by combusting the unpermeated, retentate gas stream with air. In the second case, it is recognized that thermal efficiency is best preserved by directing the retentate stream immediately to the burner zone so as to maintain its sensible heat.

In all embodiments of this invention, it is preferred to supply the reactor with a hot feed gas stream. Any reactant water that is added to the feed gas should be also be provided hot and vaporized. For endothermic reactions, feed preheating and vaporization can be achieved by appropriate contacting of the feed materials with the flue gas exhaust from the high temperature reactor zone. These methods are well known in the art and would typically involve indirect gas/gas heat exchange equipment.

For the exothermic water gas shift reaction, several scenarios are possible. In one case, a CO-containing stream may be generated in an external, high temperature process herein referred to as the primary reformer. Examples of primary reformers include high temperature steam reforming, coal gasification, and the like. In general, the syn-gas generated in the primary reformer will be at a higher temperature than the membrane reactor, and thus the stream is preferably cooled prior to being fed to the shift reactor. Such cooling can be achieved by direct injection of any additional reactant liquid water into the hot gas stream, the vaporization and heating of the water providing an excellent cooling means. In the case where additional reactant water is not required (as is often the case in primary steam reforming), the cooling of the syn-gas can be accomplished by indirect pre-heating and/or vaporization of one or more of the primary reformer feed streams.

The following five examples more fully illustrate operation of this invention:

EXAMPLE 1

Methanol Steam Reforming

Before proceeding to detail further examples of practical construction and operation, the invention may be described as preferably embodying a membrane reactor consisting of a palladium copper membrane 25 microns thick (3) supported between two screens, one as a membrane support (4) residing in the low pressure permeate chamber (1b), and the other, a screen (2) coated with catalyst in the high pressure-reaction chamber (1a). The catalyst was a co-precipitated mixture of copper, cerium, and lanthanum oxides in the proportions of 10% copper, 5% lanthanum, and the balance cerium oxide produced by urea co-precipitation and calcined in air at 450° C. for 12 hours. The area was 38 square centimeters in a rectangle of 2:1 aspect ratio, and the catalyst weight was 150 mg applied as a thin coating to an oxidized standard 40 mesh aluminum screen 0.020" thick (prior to coating) having the same length and width as the high pressure chamber of the reactor. The screen was housed in the high-pressure chamber which itself was 0.030" in height. The high-pressure chamber is bound on one side and on the edges by a solid, heat-conducting wall (1), and on the other side by the palladium/copper membrane (3). The feed to the reactor was premixed methanol and water in a molar ratio of 1.5 moles of water to 1.0 moles of methanol. The feed was first pumped under pressure into a hot vaporizer unit and the fully vaporized mixture was then fed directly into the membrane reactor at (R). The total feed rate was 0.25 ml/min of liquid, corresponding to a molar feed rate of 0.004 moles/minute of methanol. The reactor was held at a temperature of 420° C. and the pressure held at 150 psig in the high-pressure chamber. Hydrogen was permeated at atmospheric pressure through membrane (3), flowing out along (P).

The steady state operating results showed a methanol conversion of 77%. On a per gram basis of copper oxide contained in the catalyst, this translates into a specific activity of 12.3 moles methanol/gm(CuO)-hr. The hydrogen permeation rate through the membrane (3) was 0.5 moles per hour, representing a yield of about 67% on a methanol feed basis (assuming 3 moles of hydrogen possible per mole of methanol fed).

For comparison, a separate experiment was conducted in a packed bed reactor containing pellets of G66A catalyst supplied by United Catalysts, Inc. G66A has a composition of 33.3%/33.3%/33.3% by weight of copper/zinc/aluminum oxides. At 300° C. and 150 psig, the activity of G66A was determined to be 0.06 moles methanol/gm (CuO)-hr, nearly 200 times lower than the above described experiment. Correcting for the temperature differences between the two experiments (assuming an activation energy of 20 kcal/mol) reveals an expected rate on G66A of 1.2 moles methanol/gm (CuO)-hr, still a factor of 10 lower than the above described reactor. In fact, G66A is not operable at 420° C. for long periods due to activity loss.

EXAMPLE 2

Water Gas Shift Reaction

The same membrane reactor geometry as in Example 1. The catalyst was WC301B, a proprietary noble metal based water gas shift catalyst supplied by Súd-Chemie, Inc. of Louisville, Ky. The reactor was operated isothermally at 450° C. and at a pressure of 100 psig. The membrane was a 10 micron thick Pd/Cu 60/40 wt %. Values are reported to 2 significant figures. Permeate pressure is ambient.

| Species | Inlet flow sccm | Outlet flow sccm | Permeate flow sccm |
|---|---|---|---|
| $H_2O$ | 410 | 260 | 0 |
| $H_2$ | 320 | 80 | 390 |
| CO | 160 | 11 | 0 |
| $CO_2$ | 82 | 230 | 0 |
| $CH_4$ | 11 | 14 | 0 |
| $[CO_2][H_2]/[CO][H_2O]$ | 0.20 | 6.4 | 37.8 (incl. Outlet) |

The equilibrium constant for the WGS reaction at 450° C. is around 11.9. The value of 37.8 represents a temperature of approximately 325° C. Thus the membrane reactor benefit is about 125° C.

EXAMPLE 3

Water Gas Shift Reaction

Same configuration, catalyst, and membrane of Example 2, 350° C. isothermal operation, 100 psig pressure, permeate produced at ambient pressure.

| Species | Inlet flow sccm | Outlet flow sccm | Permeate flow sccm |
|---|---|---|---|
| $H_2O$ | 540 | 400 | 0 |
| $H_2$ | 260 | 90 | 310 |
| CO | 140 | 4.0 | 0 |
| $CO_2$ | 68 | 200 | 0 |
| $CH_4$ | 9.2 | 9.3 | 0 |
| $[CO_2][H_2]/[CO][H_2O]$ | 0.23 | 11.3 | 50 (incl. Outlet) |

EXAMPLE 4

Methane Steam Reforming

Same reactor configuration as in Example 3; membrane is 18 microns thick, the catalyst is designated FCR-HC 14, WC-723B also supplied by Súd-Chemie, Inc. of Louisville, Ky. Reaction conditions were 200 psig, 550° C. isothermal operation permeate pressure is ambient.

| Species | Inlet flow sccm | Outlet flow sccm | Permeate flow sccm |
|---|---|---|---|
| $H_2O$ | 270 | 120 | 0 |
| $H_2$ | 0 | 9.0 | 310 |
| CO | 0 | 9.0 | 0 |
| $CO_2$ | 0 | 70 | 0 |
| $CH_4$ | 120 | 40 | 0 |

Note that the expected $CH_4$ conversion at equilibrium under these conditions of temperature and pressure is only 17% compared to 67% in this case. To achieve the same 67% conversion of methane in an ordinary reactor at these conditions would require a temperature of about 860° C. Thus a temperature lowering benefit of nearly 300° C. is realized in the membrane reactor.

EXAMPLE 5

Methane Steam Reforming

Same reactor configuration as Example 4, 12 micron thick membrane, 570° C., 155 psig total pressure.

| Species | Inlet flow sccm | Outlet flow sccm | Permeate flow sccm |
|---|---|---|---|
| $H_2O$ | 217 | 98 | 0 |
| $H_2$ | 0 | 25.4 | 243 |
| CO | 0 | 6.6 | 0 |
| $CO_2$ | 0 | 56 | 0 |
| $CH_4$ | 69 | 5.6 | 0 |

24% otherwise versus 92% in this example. 92% conversion requires a temperature of over 950° C., representing nearly a 400° C. benefit.

What is claimed is:

1. A membrane reactor/purifier for producing mixtures comprising hydrogen and carbon oxides by steam-reforming a gaseous or externally gasified fossil fuel or a derivative thereof and generating pure hydrogen therefrom by permeating through a planar hydrogen selective palladium alloy membrane at an appropriately controlled, moderately elevated isothermal temperature range, said reactor/purifier comprising a stack containing an array of pairs of high pressure and lower pressure chambers separated by said membrane and connected to each other by metallic heat conducting plates impervious to all gases including hydrogen, and each high pressure chamber being provided with a dimensionally controlled unitary structure washcoated with a steam-reforming catalyst.

2. The reactor/purifier of claim 1 wherein said unitary structure is metallic and wherein each low pressure chamber of the array of pairs of chambers is provided with a gas-porous metallic membrane support and wherein each said unitary structure and each support facilitates heat transfer with the catalyst.

3. A hydrogen reactor/purifier system comprising a palladium-bearing membrane supported between two screens, one serving as a membrane support in a relatively low pressure permeate chamber, and the other being a catalyst-coated screen disposed in a relatively high pressure reaction chamber; and means for reacting thereon steam with one of a gaseous or gasified hydrocarbon, methanol, and syn-gas and/or carbon monoxide at an appropriately controlled temperature between about 200° C. and 650° C., with the catalyst-coated screen promoting turbulence to gas flow within the high pressure reactor.

4. The system of claim 3 wherein catalyst coated screen comprises a stainless steel or aluminum screen holder with an adhered ceria-containing oxide composition supporting an iron or copper catalyst.

5. The system of claim 3 wherein the turbulence-promoting screen bears a nickel catalyst and the steam-reforming of said hydrocarbon is carried out at an appropriately controlled temperature between about 450° C. and 650° C.

6. The system of claim 3 wherein catalyst coated screen comprises an aluminum screen holder with a noble metal based water gas shift catalyst and the steam reforming reaction is carried out at an appropriately controlled temperature between about 300 and 550° C.

7. A reactor/purifier for generating pure hydrogen, having in combination, a gas-porous screen structure washcoated with a steam-reforming catalyst; a stack of pairs of alternately connected relatively high and low pressure reactor chambers; said structure being sandwiched between a planar hydrogen-selective palladium alloy membrane and a planar gas-impermeable heat-conducting metal plate within the high pressure reactor chamber of each pair of alternating connected low and high pressure reactor chambers; means for reacting the catalyst-coated structure in each high pressure reactor chamber with steam and fuel and/or carbon monoxide at an appropriately controlled temperature between about 200° C. and 650° C. to produce hydrogen and carbon oxides within an isothermal temperature range in each high pressure reactor chamber while simultaneously permeating pure hydrogen therefrom through the membrane into the corresponding low pressure reactor chamber; and with the required heat transfer to and from said catalyst being provided in situ predominately by conduction through the corresponding metal plate.

8. The reactor/purifier of claim 7 wherein the catalyst-coated gas-porous structure is a screen structure that creates turbulence to gas flow within the high-pressure reactor chamber.

9. The reactor/purifier of claim 8 wherein the washcoated screen structure is selected from the group consisting of a metallic screen, a woven glass cloth and a non-flattened expanded metal screen.

10. The reactor/purifier of claim 8 wherein the catalytic washcoat composition comprises an oxide, including ceria, supporting a catalyst selected from the group consisting of copper, iron and nickel catalyst.

11. The reactor/purifier of claim 10 wherein the steam reacts with methanol or syn-gas and/or carbon monoxide.

12. The reactor/purifier of claim 8 wherein the catalyst-coated screen structure comprises a stainless steel screen holder with an adhered ceria-containing oxide composition supporting an iron or copper catalyst.

13. The reactor/purifier of claim 8 wherein the catalyst-coated screen structure bears a nickel catalyst wherein said fuel is a gaseous or gasified hydrocarbon and the steam reforming is carried out at an appropriately controlled temperature between about 450° C. and 650° C.

14. The reactor/purifier of claim 8 wherein means is provided for reacting a steam-methanol mixture on said structure in an appropriately controlled temperature range between about 200° C. and 550° C. to generate a mixture consisting predominantly of hydrogen and carbon oxides.

* * * * *